United States Patent [19]

Deussen

[11] 3,767,088
[45] Oct. 23, 1973

[54] DOSING CLOSURE
[76] Inventor: Werner Deussen, Scharfensteinstr. 17, 6228 Eltville, Germany
[22] Filed: Apr. 2, 1971
[21] Appl. No.: 130,606

[30] Foreign Application Priority Data
Feb. 15, 1971  Germany................... P 21 07 074.6

[52] U.S. Cl............................ 222/205, 222/448;559
[51] Int. Cl. ............................................ A47f 1/035
[58] Field of Search................... 222/204, 205, 207, 222/444, 448, 416, 559

[56] References Cited
UNITED STATES PATENTS
1,941,933  1/1934  Douglas........................... 222/205 X
2,311,367  2/1943  Chambers....................... 222/207 X
3,263,871  8/1966  Thompson......................... 222/205

Primary Examiner—Robert B. Reeves
Assistant Examiner—James M. Slattery
Attorney—Marmorek & Bierman

[57] ABSTRACT

A dosing closure device for use with a container for storage of liquids and adapted to dispense from the liquid only a predetermined quantity each time the closure is removed from its closed position, the closure includes a measuring beaker member tightly fit into the open end of the container, a conduit communicating with the measuring member for conveying the liquid thereinto, a cap member having threads thereon cooperating with corresponding threads on the container neck for securing it to the container; a piston member attached to the cap member and adapted to move therewith upward and downward in the measuring beaker member for sucking the liquid into it during the upward movement thereof.

15 Claims, 5 Drawing Figures

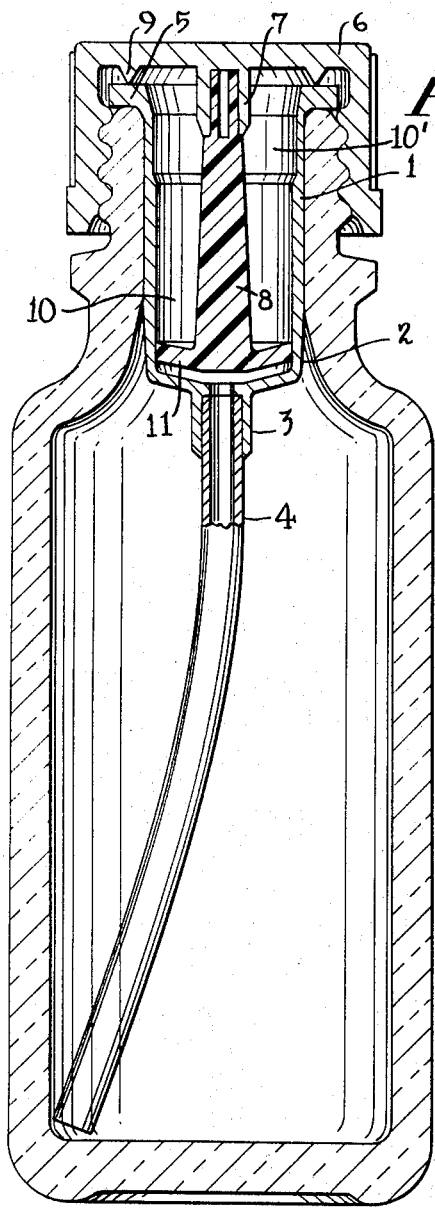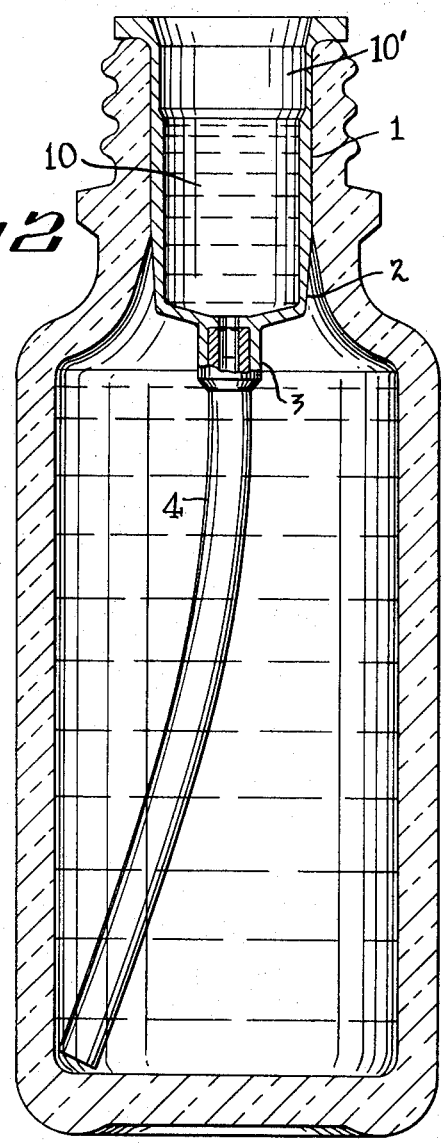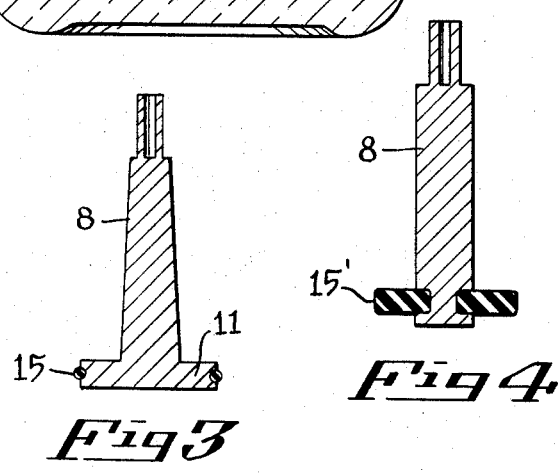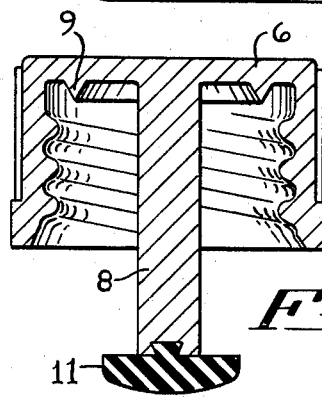

DOSING CLOSURE

FIELD OF THE INVENTION

The present invention relates to a dosing closure device for use with a container by means of which a predetermined quantity of liquid stored in the container can be predosed in such a manner that such predosed quantity can be then poured-off in one step.

BACKGROUND OF THE INVENTION

There is known a number of dosing devices for liquids which are either placed into the container itself or on the opening of the container or others, which have associated therewith a separate measuring beaker not combined with the container. In order that a certain amount of liquid could be removed into a measuring chamber and in order that a further streaming of the liquid could be cut off after the dosing has taken place, all the known devices which are either placed into or onto the container, require a valve. As a result the construction and the manufacturing of such devices become so complexed and expensive that for the simple reason of excessive costs alone the known dosing devices, for use as individual closures on a large number of containers in the pharmaceutical and chemical industries, did not get a good response from the manufacturers of such containers.

SUMMARY OF THE INVENTION

It is, therefore, an object of the present invention to provide a simple, inexpensively made dosing closure for containers for dispensing a predetermined quantity of liquid from such containers in which there is no need for a valve to cut-off the further flow of liquid after the predetermined quantity has been pre-dosed, and which are universally adaptable.

According to the present invention a closure device is provided for use with a container storing a liquid which device is capable of dispensing from the liquid in the container only a predetermined quantity each time the closure device is removed from its closed condition, and in which the closure device consist of a beaker portion in which a piston means is tightly fitted and which during its upward movement caused by the unscrewing of the cap portion of the closure device it sucks into a measuring section a predetermined amount of the liquid from the container and, upon removing the cap portion and together therewith the piston means attached thereto, the pre-dosed liquid can be poured-off in one step without additional liquid flowing into the measuring portion or out of the container.

According to the present invention the measuring section which is a part of a beaker member is tightly fitted into the opening of the bottle neck and it is cylindrical in shape, the piston comprises a shaft one end of which is attached to the inside bottom of the cap portion while the free end of the shaft has an expanded portion having a diameter substantially corresponding to the diameter of the measuring section and thereby when moved upward during the unscrewing of the cap portion it causes a suction of the liquid into the measuring section. The upper part of the beaker well set into the bottle neck has a diameter which is larger than the diameter of the measuring section and thereby, when the piston moves into the region of the upper section, the suction ceases and, as a result, the lower or measuring section may determine the maximum amount of the liuqid which the particular dosing closure can remove from the container.

The liquid is removed from the container by means of a conduit extending substantially to the bottom of the container leaving only a small gap therewith while the conduit at the upper end thereof is secured to the bottom of the measuring portion of the beaker.

In order to provide for a secured sealing of the container the beaker well on its upper end has a flange portion formed thereon with which it tightly sits on the upper edge of the container opening, while the inside bottom of the container cap has an annular bulge formed thereon which cooperates with the flange portion of the beaker.

The invention provides that the piston of the closure device is formed as a shaft the free end of which is expanded in the form of a mushroom the edge portions of which cooperate with the wall portion of the beaker member to cause the suction of the liquid into the measuring section during the upward movement of the piston. In the preferred embodiment the shaft is secured to the inside bottom of the cap portion of the dosing closure device by means of a mandrel which has a hollow recess in it into which the end of the shaft is tightly fitted. The shaft itself by virtue of the concentric position of the mandrel on the inside bottom of the cap is concentrically disposed with respect to the beaker member which itself is cylindrical in shape in the preferred embodiment. It is, however, within the scope of the present invention to provide any desired shape for the beaker member and, accordingly, the piston member will vary in its shape.

As mentioned above the maximum value of the liquid can be removed with the particular dosing cap closure from the container is determined by the volume of the measuring portion of the beaker, however, it is within the scope of the present invention to vary the quantity of the liquid removable with the same maximum volume measuring portion present by means of varying the length of the shaft or piston means and thereby varying its useful movement or stroke path during which the suction takes place.

To this effect the invention provides that the outside surface of the cap portion of the dosing closure device be colored differently, each color representing a predetermined quantity which the closure device can remove from the container.

The dosing closure device according to the present invention especially advantageously used in the pharmaceutical field and permits the simple dosing and removing of a predetermined quantity of liquid from a container. It is also essential that the dosing device according to the present invention can be used with existing container types using threaded closure caps.

BRIEF DESCRIPTION OF THE DRAWINGS

The invention will become more readily apparent from the following description of preferred embodiment thereof shown in the accompanying drawings, in which:

FIG. 1 is a sectional view of a container illustrating the dosing closure device mounted thereon in accordance with the present invention;

FIG. 2 is a similar view as in FIG. 1 with a predetermined amount of liquid sucked into the measuring portion of the dosing closure according to the present invention with the cap member removed therefrom;

FIGS. 3 – 5 illustrate various embodiments of the piston means according to the present invention in broken away illustration.

DESCRIPTION OF THE PREFERRED EMBODIMENTS

With reference to FIGS. 1 and 2 it is seen that into a container which can be a glass or plastic bottle a measuring beaker 1 made from a synthetic material is placed by being tightly fitted into the neck portion of the container and at the bottom portion 2 of the beaker 1 an extension 3 is formed into which a conduit 4 is fitted. Conduit 4 is dimensioned in such a manner that it substantially extends to the bottom of the container leaving only a slight gap therewith, thereby enabling the removal of all the liquid from the container and also when the container is turned around in order to pour-off the pre-dosed liquid from the measuring beaker 1, the conduit 4 will protrude into the air pocket forming in place of the removed liquid and, thereby no liquid will enter the conduit 4 during the pouring-off process.

The measuring beaker 1 at its other end nearer to the opening of the container has a flange 5 formed thereon with which the beaker 1 tightly sets on the upper edge of the container neck.

The measuring beaker 1 in the preferred embodiment has a cylindrical shape, although it is within the scope of the present invention to have other shapes possible and accordingly, the shaft or piston producing the section hereinafter described is appropriately shaped to fit the variations of the beaker 1. The lower section 10 of the beaker 1 has a reduced diameter with respect to the upper section thereof and such reduced diameter is substantially equal to the diameter of the end 11 of shafts moving therein during the removal of the liquid and thereby causing a suction of the liquid into the space formed by the shaft end 11 and the bottom 2 of the beaker 1. This reduced diameter chamber or section 10 forms the measuring portion of the beaker 1 and its dimension determines the maximum amount of the liquid which may be removed by the particular construction of the dosing device. Above reference has been made to the suction action taking place within the measuring portion 10 of the beaker 1 during upward movement of the shaft 8, and below illustration is given how such upward movement is taking place.

The dosing closure itself comprises the above described measuring beaker 1 which is tightly fitted within the neck portion of the container, and a cap portion 6 which can have the usual threaded arrangement to cooperate with corresponding threaded portions of the container neck to bring about the sealing of the container. The cap closure 6 according to the present invention on its inside bottom has a mandrel member 7 protruding therefrom which has a hollow center portion into which the end of shaft 8 is tightly fitted. In the preferred embodiment of the present invention and illustrated in FIG. 1 the mandrel portion 7 is centrally placed with respect to the cap member 6 and thereby the shaft 8 is concentric with respect to the beaker member 1. The shaft 8 is preferably made from a synthetic material and its free end is expanded into a mushroom-shape 11 which acts as a piston in cooperation with the wall portions of beaker 1.

The length of the shaft 8 is so dimensioned that it extends in the closed position of the cap 6 to the bottom 2 of the beaker 1 so that liquid begins to be sucked into the beaker 1 as soon as the cap 6 is becoming unscrewed.

With reference to FIGS. 3 – 5 it is noted that the shaft 8 can be made with an additional sealing ring 5 placed about its mushroom end portion 11 as seen more particularly in FIG. 3. The seal 15 then improves the suction action of the piston device within the beaker 1. The shaft 8 and its mushroom-like end portion 11 in the embodiment of FIG. 1 are shown to have been made from an integral piece of synthetic material, however, as seen in FIG. 5 the mushroom end portion 11 can be made from a separate material and attached to the shaft 8. At the same time the invention provides that the shaft can be made integral with the cap 6.

The embodiment shown in FIG. 4 is similar to FIG. 3 with the only difference that the annular sealing ring 15' here replaces the mushroom end portion 11 on the shaft 8 and it forms the sole suction part of the piston-shaft 8.

The container is filled in the regular manner then the measuring beaker 1 together with the conduit 4 attached to the extension 3 of the beaker 1 is placed then into the container through its opening. Upon placing the cap member 6 on the top of the container neck and advancing it along the threads downwardly, the shaft 8 moves downwardly into the measuring beaker 1 with the mushroom-shape end portion 11 sliding downward on the wall portion of the measuring section 10. As a result, a certain amount of air becomes pressed into the container, whereby a certain air cushion will be present above the liquid in the container and such a cushion will have a pressure slightly in excess of the atmospheric pressure.

When on the other hand the cap 6 is being removed by being advanced upwardly along the threads of the bottle neck, the mushroom-shape end portion 11 of the shaft 8 will slide upwardly along the wall portions of the measuring portion 10 of the beaker 1 and thereby causes a suction through conduit 4 and lets the liquid enter the space forming between the bottom 2 of the beaker 1 and the retreating end portion 11 of the piston means 8. The amount of liquid removable from the container during the removal of the cap 6 is determined by the volume of the measuring section 10 of the beaker 1 since, as seen in FIGS. 1 and 2, the upper section 10' of the beaker 1 has a slightly larger diameter than the lower section 10, thereby when the mushroom end portion 11 of the piston 8 passes into the region of the upper section 10' having the larger diameter, the suction will cease.

When the container is turned around in order to pour-off the pre-dosed liquid from the measuring section 10 of the beaker 1, the air cushion rises to the bottom of the container and thereby only the amount of liquid pre-dosed in the measuring section 10 can be poured-off since no more liquid can enter the conduit 4 due to the presence of air cushion. It follows necessarily that only the pre-dosed amount of liquid can be poured-off from the bottom during the above described single step of operation.

Upon replacing the cap 6 and screwing it into its place, the mushroom-shaped end portion 11 of the shaft 8 will glide downwardly along the wall portions of the measuring section 10 and forces any amount of liquid if left in the measuring beaker 1 back into the container through conduit 4. As a result, the beaker 1 and the conduit 4 will be free from the liquid and thereby clogging of the beaker 1 is prevented.

It is a special advantage of the present invention that the mushroom shape end portion 11 of the piston means guarantees that the entire contents of the container will become removed.

In the case of plant protecting sprays or materials there is no need for a separate measuring beaker as it was the case so far since the measuring beaker 1 according to the present invention forms a part of the entire closure device and at the same time performs the function of a conventional dosing apparatus.

Furthermore the invention provides an improved sealing of the cap 6 to the beaker 1 by means of an annular bulge 9 formed on the inside bottom of the cap 6 which then cooperates with the flange 5 of beaker 1.

The mushroom-shaped end portion 11 of the shaft 8 shows its special advantages during the downward movement thereof and during the suction cycle since it will tightly abut against the wall portions of the measuring section 10 of the beaker 1. The shaft 8 and its mushroom-shaped end portion 11 is preferably made from a synthetic material and, as a result, it shows elastic properties where the cross section thereof is thinner, while it is quite rigid where the cross section thereof is much thicker than the shaft portion 8 itself.

The above described parts of the closure device according to the present invention can be manufactured very simply and the container manufacturer can already assemble the cap 6 with the shaft 8 and place the beaker 1 and the conduit 4 into the container, so that the pharmaceutical plant providing the filling material will have to handle only two parts.

It is seen that according to the present invention the conventional valve devices used in known dosing apparatus are completely unnecessary.

It is also within the scope of the present invention to provide for the removal of variable liquid quantities by varying the length of the shaft 8 so that instead of extending the mushroom-shaped end portion 11 all the way down to the bottom 2 of the beaker 1, it should be extended only to a certain length into the measuring section 10 of the beaker 1. Thereby with the same measuring section 10 but using variable shaft lengths 8 liquids corresponding to different fractions of the maximum volume of the measuring section 10 can be removed from the container. For example, if the volume of the measuring section 10 of the beaker 1 is designed to remove 1 ml when the mushroom-shaped end portion 11 of shaft 8 reaches the bottom 2 of beaker 1 when the cap 6 is fully screwed onto the top of the container, then when the shaft 8 is made to enable the mushroom-shaped end portion 11 to reach only half way down into the measuring section 10 at the fully screwed in position of cap 6, will remove only 5 ml from the container.

Cap member 6 having different shaft lengths providing for different quantities can be color-coded according to the present invention.

From the above, it is apparent that although the invention has been described hereinbefore with respect to certain specific embodiments thereof, it is evident that many modifications and changes may be made without departing from the spirit of the invention. Accordingly, by the appended claims, we intend to cover all such modifications and changes as fall within the true spirit and scope of this invention.

I claim:

1. A dosing closure device for use with a container for storage for liquids and adapted to dispense from said liquid in said container only a predetermined quantity each time said closure device is removed from its closed position, said closure device comprising
   a measuring portion tightly fit into an open end of said container,
   a conduit communicating with said measuring portion for conveying said liquid thereinto,
   a cap portion having means thereon cooperating with means on said container for securing said cap portion to said container;
   a piston means attached to said cap portion and adapted to move therewith upward and downward in said measuring portion for sucking said liquid into said measuring portion during the upward movement thereof, and
   means operable for rendering ineffective the suction effect between the piston and the measuring chamber after the passage through a predetermined portion of the suction stroke.

2. The dosing closure device as claimed in claim 1, wherein said measuring portion comprises a lower section having a diameter substantially corresponding to the diameter of said piston means, and an upper section having a diameter larger than the diameter of said piston means whereby suction by said piston means ceases when said piston means passes from said lower suction into said upper section.

3. The dosing closure device as claimed in claim 2, wherein said measuring portion is cylindrical in shape and said means on said cap portion are thread means cooperating with thread means on a neck portion of said container, and said piston means is a shaft means having an expanded free end portion tightly fitting in said lower section and causing said suction when moved upward, said piston means being attached to said cap portion for concentrical movement thereof in said lower section.

4. The dosing closure device as claimed in claim 3, wherein said piston means has a length extending into the end portion of said lower section when said cap portion is tightly screwed onto said neck portion.

5. The dosing closure device as claimed in claim 1, wherein said conduit has a length extending substantially to the bottom of said container leaving only a slight gap therewith.

6. The dosing closure device as claimed in claim 2, wherein said piston means at the free end thereof has an expanded portion formed integrally therewith as a mushroom cooperating with edge portions thereof in the wall portions of said lower section to cause said suction.

7. The dosing closure device as claimed in claim 2, wherein said piston means at the free end thereof has a mushroom-shaped member attached thereto, said member with edge portions thereof cooperating with wall portions of said lower section to cause said suction.

8. The dosing closure device as claimed in claim 2, wherein said piston means at the free end thereof has an expanded portion formed integrally therewith as a mushroom, sealing means attached to the edge portions of said mushroom to cooperate with wall portions of said lower section to cause said suction.

9. The dosing closure device as claimed in claim 2, wherein said piston means at the free end thereof has an annular sealing means attached thereto, said sealing means cooperating with wall portions of said lower section to cause said suction.

10. The dosing closure device as claimed in claim 1, wherein said measuring portion at the end thereof nearer to the opening of said container has a flange means formed thereon, said cap portion on the inside bottom thereof has an annular bulge formed thereon sealingly cooperating with said flange means.

11. The dosing closure device as claimed in claim 3, wherein means are formed in the inside bottom of said cap portion for positively locking said piston means to said cap portion.

12. The dosing closure device as claimed in claim 11, wherein said positively locking means is a hollow mandrel means into which the end of said piston means is tightly fit.

13. The dosing closure device as claimed in claim 2, wherein the volume of said lower section of said measuring portion determines the maximum value of said predetermined quantity to be dispensed, the length of said piston means determining the actual quantity to be dispensed.

14. The dosing closure device as claimed in claim 1, wherein said cap portion is color coded according to the predetermined quantity to be dispensed with said dosing closure device.

15. The dosing closure device as claimed in claim 1, in combination with a liquid storing container, said measuring portion being tightly fitted into a neck portion of said container at the open end thereof, said cap portion threadedly cooperating with threads formed on said neck portion of said container.

* * * * *